June 28, 1932. L. S. HAMER 1,864,816
FLUID CONDUIT
Filed May 3, 1930 2 Sheets-Sheet 1
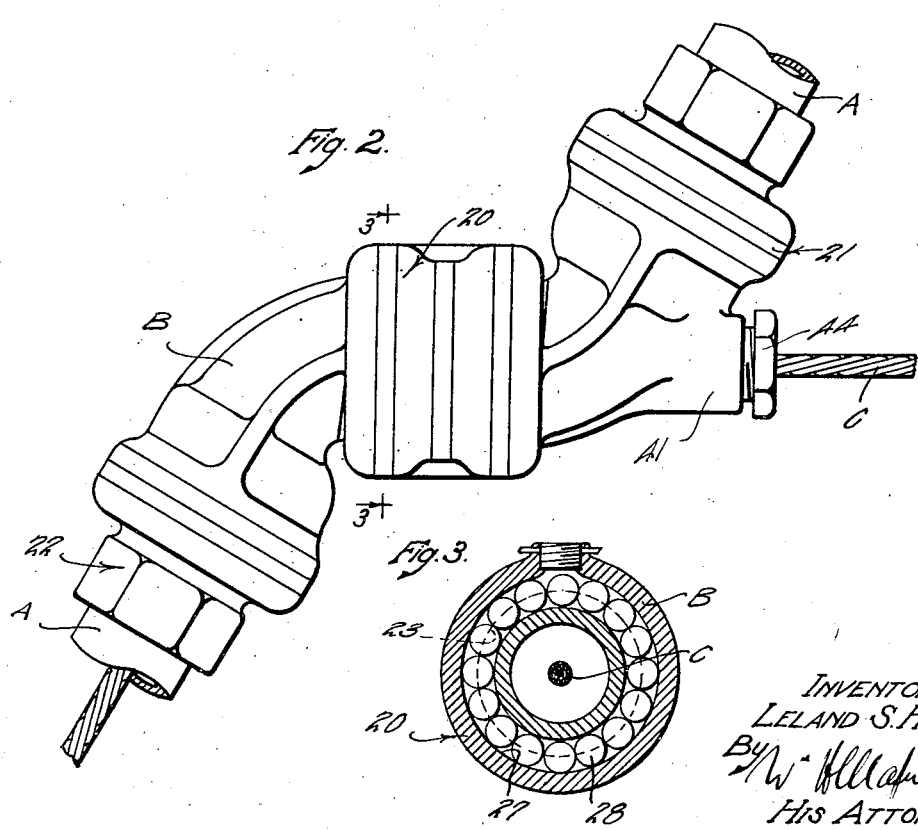
INVENTOR
LELAND S. HAMER
By [signature]
His ATTORNEY June 28, 1932.  L. S. HAMER  1,864,816
FLUID CONDUIT
Filed May 3, 1930   2 Sheets-Sheet 2
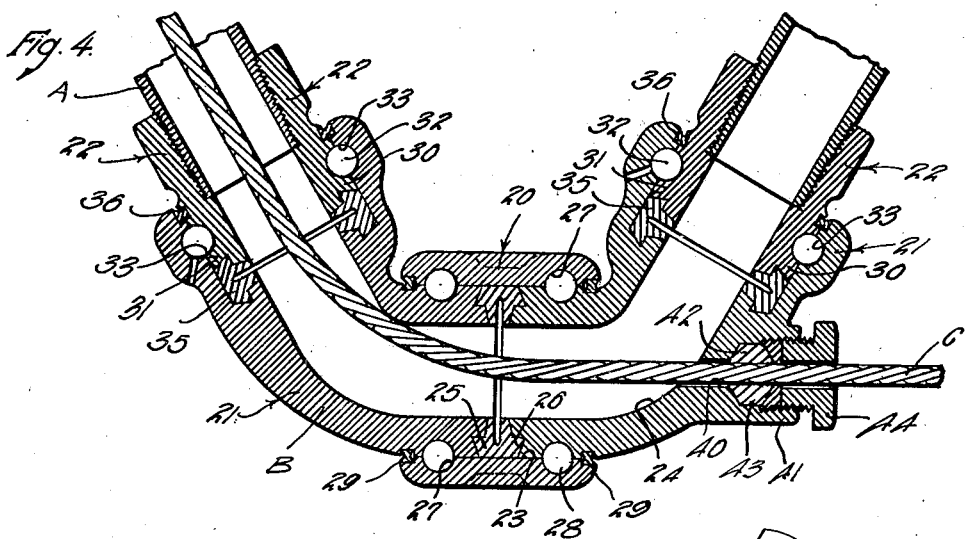
INVENTOR
LELAND S. HAMER
BY
HIS ATTORNEY Patented June 28, 1932

1,864,816

UNITED STATES PATENT OFFICE

LELAND S. HAMER, OF LONG BEACH, CALIFORNIA

FLUID CONDUIT

Application filed May 3, 1930. Serial No. 449,600.

This invention relates to a fluid conduit and relates more particularly to a flexible conduit for handling fluid at high pressure.

The conduit provided by this invention is particularly useful for handling fluid at high pressures and for use under severe working conditions. For example, the device can be used to advantage in connection with the swivel of a rotary well drilling rig. The swivel of a rotary well drilling rig is mounted at the upper end of the drilling string and is supplied with fluid under high pressures. As the drilling operations are carried on, the swivel is raised and lowered in the derrick, making it necessary for the fluid conduit connected to the swivel to be flexible. It has been the common practice to supply the fluid to the swivel by a flexible hose connection, and various types of metallic flexible conduits are used in connection with swivels of well drilling apparatus. Occasionally a fluid conduit fails and the high pressures of the fluid in the conduit causes the disjointed or disconnected parts to be whipped or swung about with great force endangering the operators and equipment in the derrick.

It is a general object of the invention to provide a flexible conduit for handling fluid at high pressures that is safe and dependable in operation.

It is another object of the invention to provide a fluid conduit formed of sections of pipe connected by swivel or flexible joints in which the sections are prevented from swinging or flying apart upon failure of the conduit when handling fluid at high pressures.

The construction provided by the present invention is especially adapted for embodiment in a conduit of the general character described and claimed in my co-pending application entitled Connection for fluid conduit, Serial Number 423,447, filed January 25, 1930.

It is another object of the invention to provide a flexible fluid conduit in which a flexible member in the form of a cable extends through the conduit and is adapted to have its ends connected to fixed parts to prevent swinging or whipping of disconnected parts of the conduit in the event that the conduit fails.

Another object of the invention is to provide a conduit construction of the character mentioned in which the cable extending through the conduit does not materially interfere with the free passage of fluid and does not interfere with the free flexing of the conduit.

It is a further object of the invention to provide a swivel or flexible coupling for a metallic fluid conduit having means for effectively sealing around a cable extending into the coupling.

Other objects and features of my invention will be best and more fully understood from the following detailed description of a typical form and application of the invention, throughout which description reference is had to the accompanying drawings, in which:

Fig. 1 is a fragmentary view of the derrick of a well drilling rig employed in the rotary method of well drilling, being a view illustrating a fluid conduit embodying the present invention connected with a swivel on the upper end of a drilling string. Fig. 2 is a side elevation of a connection embodied in the present invention. Fig. 3 is a transverse detailed sectional view taken as indicated by line 3—3 on Fig. 2. Fig. 4 is a longitudinal detailed sectional view of a connection embodied in the present invention illustrating the cable extending into and through the connection, and Fig. 5 is a top or plan view of the connection illustrated in Fig. 4 of the drawings.

The present invention is capable of embodiment in fluid conduits of various characters and is particularly adapted to be embodied in a fluid conduit formed of a plurality of sections of pipe joined or connected by swivel or flexible connections. Throughout the following detailed description I will consider the invention as embodied in a fluid conduit of the character described in my co-pending application referred to above, it being understood that the invention is not to be construed as limited to this particular application, but that it is to be taken as including any features or modifications that may fall within the scope of the claims.

The portion of the well derrick illustrated in the drawings includes the derrick proper 10 having corner posts 11, a drill stem or kelly 12 extending upwardly into the derrick, a swivel 13 on the upper end of the kelly 12, a traveling block 14 suspended in the derrick, a hook 15 attached to the traveling block 14 and carrying the bails 16 of the swivel, and various other parts common to equipment of this character. A fluid supply pipe 17 extends up one corner post 11 of the derrick 10, and the fluid conduit provided by the present invention is illustrated connecting the pipe 17 with the swivel 13.

The fluid conduit provided by the present invention includes, generally, a plurality of sections of pipe A, swivel or flexible connections B coupling the several lengths of pipe A together, and a flexible member or cable C extending through the sections A and couplings B.

The invention provides, primarily, a metallic flexible fluid conduit through which is arranged a flexible safety member to prevent the portions of the conduit from whipping or swinging about in the event that the conduit fails while handling fluid at high pressures. In accordance with the broader principles of the invention the flexible safety means C may be employed in connection with conduits of various constructions. The conduit illustrated throughout the drawings includes, broadly, the sections of pipe A and the connections B joining the sections A so that they may be moved in various directions. There may be any suitable number of sections A and the sections A may be of various lengths, depending upon the particular use for which the conduit is intended. The couplings or connections B may be alike in their general construction and each connection B includes, generally, a central section 20, two end sections 21, and couplings 22 carried by the end sections 21 for connection with the pipe sections A.

The central section 20 of each coupling B may be a straight tubular part and is provided to connect the two end sections 21. The central section 20 has a straight central opening 23 of round cross section to receive the inner ends of the sections 21. The end sections 21 are connected by the center section 20 and are swivelly connected with the section 20 so that they are free to swivel or turn relative to one another. The end sections 21 are tubular members longitudinally bent or curved as illustrated throughout the drawings. The openings or passages 24 through the sections 21 may be round in cross sectional configuration and are preferably of the same diameter. The inner end of each section 21 extends into the central section 20 and is finished to freely rotate in the opening 23 of the center section. The inner ends of the two sections 21 are preferably spaced a short distance apart and expansible packing 25 is arranged in annular recesses 26 in the ends of the sections 21 to provide a fluid-tight seal between the ends of the sections 21 and the walls of the opening 23. The end sections 21 are connected together by the center section 20 so that they are freely rotatably relative to one another and so that they are prevented from being displaced or disconnected from the center section 20. In the particular case illustrated the opening 23 of the center section 20 and the inner end portions of the sections 21 are provided with registering grooves which form a raceway or channel 27 for carrying a plurality of balls 28. The balls 28 fit the channel 27 in a manner to allow free relative rotation between the sections 21 and 20 and to hold the sections against relative longitudinal movement. Packing 29 may be arranged between the outer ends of the opening 23 and the exterior of the sections 21 to form a seal between the sections 20 and 21.

The couplings 22 are carried at the outer ends of the sections 21 to swivelly connect the sections A of pipe with the connections B. The couplings 22 are tubular parts and each has a finished inner end part 30 which extends into an enlargement 31 in the bore of a section 21. The finished parts 30 of the couplings 22 are freely rotatable in the enlargements 31 and are held against displacement from the sections 21 by a plurality of balls 32 arranged in channels 33 formed by registering grooves in the finished parts 30 and enlargements 31 of the bore. Expansible packing 35 may be arranged in the bore enlargements 31 between the inner ends of the couplings 22 and the bottoms of the enlargements 31. Packing 36 may be provided in the outer portions of the enlargements 31 to seal with the couplings 22. The couplings 22 are formed to receive or connect with ends of the sections A of pipe. In the case illustrated the pipe sections A are screw-threaded into the outer ends of the couplings 22.

The flexible member or cable C extends longitudinally through the conduit from a point adjacent the connection of the conduit with the supply line 17 to a point adjacent the connection of the conduit with the swivel 13. The cable C extends through the several pipe sections A and connections B and passes from the conduit at points adjacent its ends. In the preferred form of the invention a single unitary length of cable C extends through the conduit from one end to the other. The cable C may be a stranded cable sufficiently flexible to permit the free flexing of the conduit and sufficiently strong to prevent excessive relative swinging of disjointed sections of the conduit in the event that the conduit fails while passing fluid at high pressures.

In accordance with the preferred form of the invention the cable C extends into the conduit through the walls of the couplings or connections B at or close to the ends of the conduit. The couplings B formed to pass the cable C into the conduit may be of the same general construction as the several connections B intermediate the ends of the conduit. The connection B at the upper end of the conduit adjacent its point of connection with the supply line 17 passes an end of the cable, while the connection B adjacent the opposite end of the conduit at the swivel 13 passes the opposite end portion of the cable C. One of the sections 21 of the connection B for passing the cable C into the conduit is provided with an opening 40 through which the cable C extends. The opening 40 extends through the wall of the section 21 and may be substantially coaxial with the opening 23 of the center section 20. In accordance with the preferred form of the invention means is provided in the opening 40 for sealing around the cable C. A boss or enlargement 41 is provided on the exterior of the section 21 at the opening 40 and an enlargement or socket 42 is provided in the outer portion of the opening. Packing 43 is arranged in the bottom of the socket 42 to seal with the cable C and a compressing member or gland 44 is threaded into the socket 42 to compress the packing into effective sealing engagement with the cable C.

The projecting end portions of the cable C may be connected with any suitable parts or equipment in the derrick 10. In the particular case illustrated the upper end portion of the cable extending from the conduit at the supply line 17 is connected with a corner post 11 of the derrick 10. The portion of cable C extending from the opposite end of the conduit may be connected with a bail 16 of the swivel 13.

It is believed that the operation and utility of the conduit construction provided by the present invention will be readily apparent from the foregoing detailed description. It is to be noted that the invention provides a means for preventing excessive swinging or whipping of disjointed sections of a broken conduit. The cable C does not in any way interfere with the effective operation of the conduit and does not interfere with the free flow of fluid through the conduit. In the event that the conduit parts fail when passing fluid, the cable C having its ends secured to relatively fixed parts, positively prevents the parted sections of the conduit from whipping about and injuring the operators, etc.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A flexible conduit, a cable arranged in the conduit and passing from the conduit at longitudinally spaced points, and means for sealing around the cable where it passes from the conduit.

2. A flexible conduit including, a plurality of tubular sections and connecting sections swivelly connecting the tubular sections, a cable extending longitudinally through the tubular sections and connecting sections and passing through openings in the walls of two of the sections, and packing in the openings to seal around the cable.

3. A flexible conduit including, a plurality of tubular sections, connecting sections swivelly connecting the tubular sections, a flexible member extending longitudinally through the sections and passing through openings in longitudinally spaced sections to the exterior of the conduit whereby it may be connected to relatively fixed objects entirely external of the conduit, and means at the said openings for sealing about the flexible member.

4. A flexible conduit including, a plurality of tubular sections, connecting sections swivelly connecting the tubular sections, a flexible member extending longitudinally through the sections and passing through an opening in one of the connecting sections to the exterior of the conduit whereby it may be connected to an object entirely external of the conduit, and means at the said opening for sealing about the flexible member.

5. A flexible conduit including, a plurality of tubular sections, connections swivelly connecting the tubular sections, the connections including relatively rotatable members, a safety element extending longitudinally through the tubular sections and passing through an opening in one of the said members to the exterior of the conduit whereby it may be connected to a relatively fixed object entirely external of the conduit, and means in the said opening for sealing about the safety element.

6. In a flexible conduit the combination of, a swivel connection for two lengths of tubing, said connection including relatively rotatable sections, one of said sections having an opening to its exterior, a flexible safety member adapted to extend through the conduit, the said safety member passing through said opening to the exterior of the conduit whereby it may be attached to a relatively fixed object entirely external of the conduit, and means at the said opening for sealing about the safety element.

In witness that I claim the foregoing I have hereunto subscribed my name this 29th day of April, 1930.

LELAND S. HAMER.